United States Patent
Haimer (10) Patent No.: US 9,832,819 B2
(45) Date of Patent: Nov. 28, 2017

(54) INDUCTION COIL UNIT (75) Inventor: Franz Haimer, Igenhausen (DE)

(73) Assignee: Franz Haimer Maschinebau KG, Hollenbach-Igenhausen (DE)

( * ) Notice: Subject to any disclaimer, the term of this patent is extended or adjusted under 35 U.S.C. 154(b) by 643 days.

(21) Appl. No.: 14/344,631

(22) PCT Filed: Sep. 11, 2012

(86) PCT No.: PCT/EP2012/067717
§ 371 (c)(1),
(2), (4) Date: Oct. 24, 2014

(87) PCT Pub. No.: WO2013/037761
PCT Pub. Date: Mar. 21, 2013

(65) Prior Publication Data
US 2015/0041456 A1  Feb. 12, 2015

(30) Foreign Application Priority Data
Sep. 13, 2011  (DE) .................. 10 2011 082 611

(51) Int. Cl.
*H05B 6/14*  (2006.01)
*B23P 11/02*  (2006.01)
(Continued)

(52) U.S. Cl.
CPC .............. *H05B 6/14* (2013.01); *B23P 11/027* (2013.01); *H05B 6/101* (2013.01); *H05B 6/365* (2013.01)

(58) Field of Classification Search
CPC combination set(s) only.
See application file for complete search history.

(56) References Cited

U.S. PATENT DOCUMENTS

| 3,525,842 | A | * | 8/1970 | Steinhoff | ................. | C21D 9/38 |
| | | | | | | 219/639 |
| 4,119,825 | A | * | 10/1978 | Taylor | ..................... | H05B 6/42 |
| | | | | | | 219/635 |

(Continued)

FOREIGN PATENT DOCUMENTS

| CN | 201231397 Y | 5/2009 |
| DE | 922700 C | 1/1955 |

(Continued)

OTHER PUBLICATIONS

International Preliminary Report on Patentability and Written Opinion dated Mar. 18, 2014 in connection with Application No. PCT/EP2012/067717.

(Continued)

*Primary Examiner* — Anne M Antonucci
*Assistant Examiner* — Renee M Larose
(74) *Attorney, Agent, or Firm* — Locke Lord LLP; Scott D. Wofsy; Arpita G. Buesing (57) ABSTRACT

The induction coil unit for heating a component that is rotationally symmetrical relative to an axis (7), in particular a tool holder (5), comprises a plurality of coils (19) arranged about the axis (7) of the tool holder (5) with pole elements, which are movable radially with respect to the axis (7), which are connected to one another by a common yoke ring (17). Upon excitation of the coils (19) with alternating current, the latter produce a magnetic flux running in the peripheral direction in the tool holder (5) for the inductive heating of the tool holder (5). The induction coil unit (1) can be moved in an oscillating manner by means of a drive (87) in the direction of the axis (7), the pole elements (21) moving in an oscillating manner along the tool holder (5). An induction coil unit of this type is in a position to heat a comparatively large region of the tool holder (5) despite a (Continued)

comparatively small energy requirement and comparatively small dimensions.

25 Claims, 6 Drawing Sheets

(51) Int. Cl.
*H05B 6/10* (2006.01)
*H05B 6/36* (2006.01)

(56) References Cited

U.S. PATENT DOCUMENTS

| | | | | |
|---|---|---|---|---|
| 4,584,449 | A * | 4/1986 | Timmons | H05B 6/02 |
| | | | | 219/635 |
| 4,745,251 | A * | 5/1988 | Vickers | H05B 6/101 |
| | | | | 219/641 |
| 6,097,926 | A * | 8/2000 | Takagi | G03G 15/2053 |
| | | | | 219/216 |
| 6,323,469 | B1 * | 11/2001 | Bissdorf | H05B 6/40 |
| | | | | 219/632 |
| 6,712,367 | B1 | 3/2004 | Irion et al. | |
| 6,755,228 | B2 | 6/2004 | Kelch | |
| 6,867,396 | B2 | 3/2005 | Haimer | |
| 6,991,411 | B2 * | 1/2006 | Irion | B23B 31/02 |
| | | | | 219/635 |
| 2001/0054471 | A1 * | 12/2001 | Kelch | B23B 31/1179 |
| | | | | 156/85 |

FOREIGN PATENT DOCUMENTS

| | | |
|---|---|---|
| DE | 19915412 A1 | 10/2000 |
| DE | 10025004 A1 | 11/2001 |
| DE | 10046547 A1 | 3/2002 |
| DE | 20203784 U1 | 7/2003 |
| DE | 102005005892 A1 | 8/2006 |
| DE | 102008045781 A1 | 3/2010 |
| WO | WO-0224965 A1 | 3/2002 |
| WO | WO-2008098752 A2 | 8/2008 |

OTHER PUBLICATIONS

Search report dated Apr. 25, 2012 in connection with German Patent Application No. 102011082611.4.
International Search Report dated Jan. 3, 2013 in connection with PCT Application No. PCT/EP2012/067717.

* cited by examiner

INDUCTION COIL UNIT

The invention relates to an induction coil unit for heating a component, which is rotationally symmetrical relative to an axis and made of an electrically conductive material and, in particular, for heating a sleeve part, which holds an elongate item in a press fit in a receiving opening that is central with respect to the axis, preferably to heat the sleeve part of a tool holder, which holds a shaft of a rotary tool, in particular a drilling or milling tool, in a press fit in its opening that is central with respect to the rotational axis.

It is known to shrink the cylindrical shaft of a tool to be driven to rotate, for example a drill or a milling cutter, into a substantially cylindrical receiving opening of a tool holder. The tool shaft has an excess dimension in relation to the internal diameter of the receiving opening. To insert or remove the tool shaft, the sleeve part of the tool holder contained in the receiving opening is heated until the internal diameter of the receiving opening has expanded to such an extent that the tool shaft can be inserted or removed. After cooling, the sleeve part holds the tool shaft in a press fit.

While the insertion of the tool shaft into the tool holder that has been expanded by heat generally proceeds without problems, the tool holder has to be heated so quickly to remove the tool shaft from the tool holder that the tool holder expands before the tool shaft is also heated by heat conduction, which leads to the tool shaft jamming in the tool holder and makes the unclamping of the tool more difficult, if not even impossible.

It is known to inductively heat the tool holder that generally consists of steel, i.e. an electrically conductive material, by means of eddy currents produced by an induction coil unit. The induction coil of conventional apparatuses coaxially surrounds the tool holder here. An induction coil of this type produces an axially running magnetic flux, which heats the tool holder, in the tool holder surrounded by said induction coil.

However, it has been shown that an induction coil of this type produces stray magnetic fields, which do not only heat the tool holder but, to a certain extent, also the tool held therein in a press fit. In order to avoid this, it is known from DE 199 15 412 A1 to cover the end face of the induction coil adjacent to the tool with a pole disc made of soft magnetic material, for example ferrite. The pole disc resting on the tool-side end of the tool holder concentrates the magnetic flux in the tool holder and to a certain extent shields the tool shaft from stray fields. The induction coil known from DE 199 15 412 A1 cannot, however, uniformly heat the tool holder, so damage to the tool holder from overheating can occur locally. Moreover, the pole disc resting on the end of the tool holder prevents radially projecting tools guided directly up to the end of the tool holder being able to be shrunk in.

A further induction coil unit is known from DE 10 2005 005 892 A1, in which a plurality of pole elements arranged distributed in the peripheral direction and made of soft magnetic material are radially adjustably arranged in a yoke ring made of soft magnetic material. The pole elements have end faces radially facing the tool holder, which can be brought into linear abutment contact with the peripheral face of the tool holder. The pole elements are surrounded by separately associated coils and induce, when they are fed in a manner known per se with alternating current, magnetic fluxes in the tool holder, said magnetic fluxes flooding through the tool holder in the peripheral direction and producing eddy currents heating the tool holder. As the pole elements rest on the peripheral face of the tool holder, a pole disc, which rests on the end face of the tool holder, as provided in DE 199 15 412 A1, is superfluous, and accordingly, radially projecting tools can be shrunk in up to the end of the tool holder.

In the induction coil unit known from DE 10 2005 005 892 A1, the axial ends of the end faces of the pole elements resting on the outer face of the tool holder run at a spacing from the tool holder, which increases the magnetic resistance of the magnetic flux circuit in the region of the ends, so a local overheating of the tool holder in these regions is adequately avoided for many applications. However, it has been shown that adapting the end faces of the pole elements is laborious and is not sufficient for many applications to avoid local overheating of the tool holder.

Conventional induction coil units direct the magnetic flux produced by induction coils into the component to be heated in such a way that the magnetic flux completely overlaps the region to be heated. A region is generally inductively heated here that is greater than the axial region to be expanded, for example, in a tool holder by the clamping and unclamping of the tool. Conventional induction coil units are therefore generally over-dimensioned in terms of energy and also in terms of space, in particular in order to also be able to heat components, in particular tool holders of different dimensions. The over-dimensioning of conventional induction coil units can, however, lead to stray magnetic fields, which also heat the tool to be unclamped and can sometimes make the unclamping substantially more difficult.

Regarding a first aspect, it is the object of the invention to indicate a method by which the component and, in particular a tool holder, can be safely heated with a comparatively low energy outlay and thus reduced field intensity of stray magnetic fields.

Regarding the first aspect, the invention is based on an induction coil unit for heating a component that is rotationally symmetrical relative to an axis, in particular a tool holder, which comprises:
  a receiving space that is central with respect to the axis for the component,
  at least one pole element made of a material with soft magnetic properties conducting magnetic flux,
  at least one coil that can be fed with alternating current to produce magnetic flux in the at least one pole element,
  wherein the at least one pole element has an end face, which substantially radially faces the axis and has abutment contact, or virtually abutment contact, with the outer peripheral face of the component.

It is provided according to the invention in an induction coil unit of this type that a drive arrangement is provided, which drives at least the at least one pole element and a holder for the component, at least securing a part of the timespan, in which the at least one coil is fed with alternating current, to move relative to one another in the direction of the axis in a longitudinally movable manner and/or to rotate about the axis. The induction coil unit and the holder can be connected to one another here to form an apparatus unit.

An induction coil unit of this type is based on the idea of not continuously feeding the magnetic flux produced by the at least one coil in the entire region to be heated, but limiting it to a part region of the entire region to be heated and instead moving this part region once or several times in the manner of a scanning movement over the entire region to be heated. This utilises the fact that the component is able to store the heat produced locally in the part regions but that less energy has to be provided to produce the eddy currents in the part region. Moreover, purely on the basis of suitable selection of the scanning movement, the region to be heated as a whole can be established. By selecting the speed and/or the residence time, the quantity of heat fed locally to the component can be varied. This can be achieved, in particular, in that the at least one coil and the at least one pole element form a unit that can be moved relative to the holder and the drive arrangement drives this unit and the holder in an oscillating movement relative to one another in the direction of the axis. By controlling the amplitude of the oscillating movement and/or the frequency, the desired overall heating of the component can be controlled. A controller, which also controls the instantaneous speed of the relative movement and/or the current strength of the alternating current feeding at least one coil depending on the instantaneous position of the at least one pole element relative to the holder, is expediently associated here with the drive arrangement.

The induction coil unit can comprise a plurality of, in particular an even number, of pole elements distributed about the axis, which are guided movably on the unit radially with respect to the axis and are movable between a position close to the axis and a position remote from the axis, and with their end faces substantially radially facing the axis in the position close to the axis, have abutment contact, or virtually abutment contact, with the outer peripheral face of the component. An induction coil unit of this type can be moved in an oscillating manner along the component in the direction of the axis in order to increase the region axially covered by the pole elements. In other words, the axial height of the pole elements may be smaller than the axial region of the component to be heated. The pole elements expediently have here abutment contact, or virtually abutment contact, with the component, at least in a part region of their axial height.

In conventional induction coil units, as are known, for example, from DE 199 15 412 A1, the magnetic flux is produced by a single coil surrounding the component, the coil extending over an axial length that is greater than the axial region of the component to be heated, the tool holder here. The first aspect of the invention can also be applied to induction coil units of the type known from DE 199 15 412 A1, in which a coil surrounding the component is provided, one or more pole elements being provided on at least one axially situated side of the coil, preferably on the two axial sides of the coil. The pole elements can also be configured as a pole disc if the opening diameter of the pole disc allows the oscillation movement mentioned of the coil relative to the component in the direction of the axis.

Instead of the pole disc, a plurality of pole elements offset at an angle in relation to one another in the peripheral direction can also be provided, which are optionally radially movable with respect to the axis in order to thus also be able to adjacently follow a, for example conical outer casing of the component.

The first aspect of the invention can be used, in particular, in an induction coil unit of the type known from DE 10 2005 005 892 A1, as an induction coil unit of this type has comparatively small axial dimensions. An induction coil unit of this type comprises:
- a receiving space that is central with respect to the axis for the component,
- an in particular even number of pole elements, which are distributed about the axis, in particular at equal angular intervals and made of a material with soft magnetic magnetic flux-conducting properties,
- at least one coil that can be fed with alternating current to produce magnetic fluxes in the pole elements, in particular a plurality of these coils, wherein the pole elements are movably guided on the unit radially with respect to the axis and can be moved between a first position close to the axis and a second position remote from the axis, and wherein the pole elements have end faces substantially radially facing the axis, which end faces have abutment contact or virtually abutment contact with the outer peripheral face of the component in the first position.

The end faces of the pole elements here expediently have abutment contact, or virtually abutment contact, with the outer peripheral face of the component at least in a part region of their axial height along a generatrix of an outer peripheral face of the component.

The generatrix of the outer peripheral face is the contour limiting line in the mathematical sense. If the radial direction, axial direction or peripheral direction are mentioned here and below, the direction details always relate to the axis mentioned. Pole elements and also other materials mentioned here and below with soft magnetic, magnetic flux-conducting properties, such as, for example, pole rods or yokes or the like, consist of electrically non-conductive material in order to not produce any eddy current losses in these elements. The number of pole elements and/or coils is preferably even. It is obvious that an odd number of pole elements and/or coils can also be used. Also a "transverse field" of the type described can be produced with a number of coils differing from the number of pole elements. In the individual case, a single coil is sufficient.

The pole elements may be one-piece plates or rods with a rectangular, square or round cross-section and, correspondingly, the form of the end face varies along the one-piece element. It is obvious that the region of the end face can also be a removable part in terms of operation of the otherwise one-piece pole element, as is described in DE 10 2005 005 892 A1.

So that the pole element can also adapt to a contour of the component that changes in the direction of the axis, it may also be configured as a stack of a plurality of pole rods guided so as to be movable relative to one another in parallel with one another radially with respect to the axis. The ends of these pole rods facing the axis form part end faces, which together form the end face of the pole element.

The incline of the end face of the pole elements intended for abutment on the component should be selected in such a way that the end face has as close a contact as possible, in particular linear contact, with the outer casing of the component. In many cases, the component, as is conventional, for example, in tool holders, has a conical outer casing, which can be different from tool holder to tool holder. DE 10 2005 005 892 A1 describes pole elements, of which the region forming the end face is formed by a foldably articulated component in order to thus be able to adapt to a changing inclination angle of the contour. As the foldable component is, however, a component of the magnetic flux-conducting pole, air gaps that increase the magnetic resistance cannot be ruled out. Moreover, the pole elements consist of brittle material, generally ferrite, which contains within it the risk of damage.

With regard to a second aspect, which relates to a preferred configuration of the above-described first aspect, but also has an independent inventive significance in induction coil units with features differing from the first aspect, it is provided that the pole elements can be movably guided in a guide element, in each case, between the first and the second position and that the guide elements are in each case pivotably movably mounted about a common plane running transversely to the axis and, in particular in a plane that is normal with respect to the axis. As, unlike that described in DE 10 2005 005 892 A1, the pole elements are pivoted as a whole in order to adapt the end faces thereof to the inclinational angle of the outer casing of the component, the pole elements are mechanically stable despite their adaptability and have, compared to conventional pole elements, a comparatively low magnetic resistance. It is obvious that the guide elements can be coupled to one another and, in particular, also to a common drive member for a pivoting movement in the same direction by means of a gearing in order to bring them jointly into, for example, linear abutment contact with the outer casing of the component. The adaptation timespan can thus be kept short if, for example, different tool holders are to be heated.

The idea claimed with regard to the second aspect can not only be used in one-piece pole elements, but advantageously also in pole elements that are configured as a stack of a plurality of pole rods movably guided relative to one another radially with respect to the axis and parallel to one another in order to not only be able to bring the contact face of the component in an approximate manner in stages into abutment contact with the pole rods, but to be able to also place the pole rods in turn linearly or flat against the component.

Each pole element may have a linear tooth system, which meshes with a drive pinion mounted on its guide element, the drive pinion having a drive connection to a common drive member, as also described below for pole elements constructed from stacks of pole rods. The drive member ensures a positive or non-positive feed and return movement of the pole elements. The feed movement, which brings the pole element into abutment contact with the component, when there is an angular error between the end face of the pole element and the component, ensures that a tilting moment is exerted on the guide element, which brings the pole element into linear or surface contact with the structural element. A separate drive member for the guide element, as will be described below, can therefore optionally be dispensed with. The magnetic forces occurring when the coils are energised also ensures a further orientation of the angular position of the pole element relative to the component. This applies, in particular, with regard to the previously described second aspect of the invention.

During the oscillation movement taking place in the direction of the axis, a relative movement between the end face of the pole elements, on the one hand, and the outer peripheral face of the component to be heated, on the other hand, may occur. In order to avoid damage due to wear on the pole elements, on the one hand, and the components to be heated, on the other hand, it is provided in a preferred configuration that the at least one pole element adjacent to the axis carries an end face element, which can be rotated or pivoted about a rotational axis running transversely to the axis and is made of a material with soft magnetic, magnetic flux-conducting properties, which forms an end face, which is curved about the rotational axis, in particular circularly curved coaxially with respect to the rotational axis and can be rolled in abutment contact on the outer peripheral face of the component. The end face element can be configured as a wheel or roller or ball and rolls on the component to reduce wear. In this configuration, the end face element is a component of the magnetic flux path. If each pole element carries only a single rotatable or pivotable end face element, it is sufficient if the pole element is only movably guided radially with respect to the axis. The pole element does not have to be additionally pivotably mounted, as angular errors are compensated by the end face element. An end face element of the above-described type has point contact with the component on a conical outer peripheral face of the component. In order to be able to at least approximate a linear contact, at least two end face elements are expediently mounted axially parallel to one another and offset with respect to one another in the direction of the axis on the pole element.

The lateral surface of the end face element can be varied in the direction of its rotational or pivot axis, for example with the formation of apex regions, as described below with regard to the third aspect of the invention. It is obvious that the end face elements may also be varied with respect to their size. In particular, end face elements associated with one and the same pole element may have a different size and/or cross-sectional contour.

In one variant, in which the pole element, as described with regard to the second aspect, is pivotably mounted, the end face of the pole element may be substantially circularly curved about the pivot axis coaxially to the pivot axis, so the pole element as such can roll with its end face on the outer face of the component when the induction coil unit carries out an oscillation movement relative to the component.

With regard to a third aspect, which relates to a preferred configuration of the first or second aspect, but also has independent inventive significance in induction coil units with features differing from the first or second aspect, it is the object of the invention to provide an induction coil unit for heating a rotationally symmetrical component, in particular a sleeve part, for example of a tool holder, which can be adapted more easily than previously to different components in order to heat the component more uniformly than previously.

The aforementioned object is achieved with regard to the third aspect in that at least the part region of the end face of each pole element intended for abutment or virtual abutment is formed as an apex region extended along the axis of part faces converging with another toward the axis, the radial height of the axially normal cross-sectional face of the pole element limited by the part faces being varied radially with respect to the axis and/or the radius of curvature of the apex region in the axially normal cross-sectional face being varied and/or the width of the apex region, viewed in the peripheral direction of the component, being varied in the axially normal cross-sectional face along the axis.

Owing to the variation of the radial height and/or radius of curvature and/or the width of the apex region due to the configuration of the part faces converging with one another, the local magnetic resistance of the end faces can easily be varied and therefore the magnetic flux in the component can be locally varied in a shunt to the regions of the end face abutting the component and adapted.

In a preferred configuration, which allows the pole element to also adapt to a contour of the component that changes in the direction of the axis, at least one, or preferably all, the pole elements are configured as a stack of a plurality of pole rods that are movably guided relative to one another parallel to one another radially with respect to the axis. The ends of these pole rods facing the axis form separate apex regions, the radial height of the axially normal cross-sectional faces limited by the part faces being varied radially with respect to the axis and/or the radius of curvature of the apex region being varied in the axially normal cross-sectional faces and/or the width of the apex region, viewed in the peripheral direction of the component, varying in the axially normal cross-sectional face along the stack direction, at least between two pole rods that are adjacent in the stack. In this configuration, not only can the magnetic flux be influenced, but it can also be ensured that the pole element configured as a stack of pole rods can automatically adapt to the outer contour of the component. A pole element of this type may, for example, rest on a conical outer casing, even if the cone angle of the component varies from component to component or else within the component. The stack of pole rods adequately approximates the peripheral contour of the component in practice, even if the generatrices of the end faces of the individual pole rods run axially parallel to the axis.

The variation of the end faces of the pole elements or pole rods, viewed in the sectional planes that are normal to the axis, in each case allows the magnetic flux to be locally adapted to a varying material cross-section of the component to be heated. Especially in tool holders, the material cross-section of the sleeve portion receiving the tool shaft increases from the tool insertion side, i.e. the tool holder in this region has a conical outer casing and, accordingly, the peripheral length, within which the magnetic flux surrounds the cone, also changes. In order to ensure a uniform heating of a component with a material cross-section increasing in the direction of the axis, in particular of a sleeve part with a conical outer casing, it is expediently provided that with the material cross-section of the component growing along the axis, the radial height of the axially normal cross-sectional face limited by the part faces decreases radially with respect to the axis and/or the radius of curvature of the apex region increases in the axially normal cross-sectional face and/or the width of the apex region, viewed in the peripheral direction of the component, increases in the axially normal cross-sectional face.

In a particularly simple configuration, the part faces inclined toward one another and the apex face are substantially level faces, which limit a trapezoidal, axially normal cross-sectional face. Alternatively, the part faces inclined toward one another and/or the apex face may be convexly curved faces, which limit an arcuate, limited axially normal cross-sectional face.

It is obvious that the end face of the pole elements may be varied, uniformly changing in accordance with the above-described principles in the direction of the axis, specifically independently of whether the pole elements are configured in one piece or configured as a stack of pole rods. The variation may, however, take place in a stepped manner in pole elements constructed of pole rods.

The pole rods are displaceable in relation to one another within the stack of each pole element and can be guided directly on one another or else on guide faces of a predetermined pole rod of the stack transversely to the displacement direction, as described, for example, in DE 10 2005 005 892 A1. As an alternative, the pole rods may also, however, be guided on faces fixed to the housing of the induction coil unit.

During operation, the pole rods should come into abutment contact with the outer casing of the component. Pressing forces suitable for this are already produced by the magnetic field in the alternating current excitation of the coils. However, it has been found that the magnetic field forces are sometimes not sufficient to bring all the pole rods into secure abutment contact with the component, in particular if a part of the pole rods already closes the magnetic flux circuit, while other pole rods are still spaced apart from the component. As described in DE 10 2005 005 892 A1, feed springs can be associated with the individual pole rods and can ensure adequate, uniform contact pressures. However, in this configuration, care has to be taken that, to remove the component from the induction coil unit, the pole rods can be pushed back again into the second position by suitable mechanisms, which leads to a comparatively large construction outlay, in particular if the pole rods of each stack are to follow a changing contour of the component.

With regard to a fourth aspect of the invention, which contains a preferred development of the first to third aspects, but also has independent patentable significance, it is provided that at least one or all of the pole elements are in turn configured as a stack of a plurality of pole rods that are movably guided relative to one another parallel to one another, radially with respect to the axis, the ends of which facing the axis form the end face of the pole element, and in that a drive mechanism is associated with the pole elements configured as a stack of pole rods, said mechanism driving the pole rods jointly for the movement between the first and the second position, in particular in a positive manner, a device limiting the drive force to be transmitted, in particular a slide coupling, being arranged in the drive force transmission path between a drive member and at least a partial number of pole rods.

In a configuration of this type, the pole rods of each stack can be pushed jointly by a manual or else motorised drive member against the outer face of the component into abutment contact. The drive force-limiting devices ensure here that the abutment contact of the individual pole rods with the component is also produced when the path to be covered by the individual pole rods is irregular because of the outer contour of the component. The drive mechanism can be used both for the feed movement and for the return movement of the pole rods.

The drive member drives the pole rods over drive force transmission paths, which contain devices that are separate from one another and limit the drive force. The drive force transmission paths may be connected in series here if the slide couplings are designed for the forces that are then to be transmitted in a staggered manner. Parallel transmission paths from the drive member to the individual pole rods are also suitable, as equally dimensioned drive force limiting devices, such as, for example, slide couplings, can be used here. In a particularly simple configuration, it is provided that at least a partial number of pole rods of each pole element each has a linear tooth system, which meshes with a pinion, which has a drive connection by means of a slide coupling in each case to the drive member or another of the pinions. Each pole rod to be driven expediently comprises a linear tooth system of this type, while slide couplings are only provided between pinions of the type that have to complete additional paths or avoid them in accordance with the outer contour of the component. A simple and operationally reliable configuration provides here that the pinions and the slide couplings are arranged on a common shaft parallel to the axis. A shaft of this type is expediently provided for each pole element configured as a stack of pole rods. In particular, the shaft is also utilised to guide the pole rods. In order to be able to drive the individual shafts from a common drive member, the shaft carries a gear wheel, which meshes with a ring gear wheel that is concentric to the axis and has a rotary drive connection to the drive member.

The general aim of the present invention is to configure the induction coil unit in such a way that it can be used as diversely as possible and therefore to heat components with different outer contours in the region to be heated. One of the parameters, with respect to which the components, in other words, for example, the tool holders, can be distinguished, is the length of the axial region to be heated. The receiving sleeve of the tool holder should only be heated over the length of that region in which the tool shaft is held in a press fit. Regions of the receiving sleeve not involved in the press fit should not be affected by heating in order to prevent long-term damage to the tool holder. Unnecessarily heating of large regions of the tool holder does not only increase the energy requirement during heating, but also the energy requirement during the following cooling and brings about a lengthening of the cycle time when clamping and unclamping the tool.

With regard to a fifth aspect, the object of the invention is to indicate a method as to how the region of the component to be heated can be limited to a desired extent in the direction of the axis. This aspect forms a preferred development of the invention with regard to the aforementioned first to fourth aspects, but also has independent inventive significance in induction coil units with other end face configurations of the pole elements or another drive of pole elements consisting of pole rods.

According to the fifth aspect of the invention, it is provided that at least one or all the pole elements are configured as a stack of a plurality of pole rods that are movably guided relative to one another parallel to one another radially with respect to the axis, the ends of which facing the axis form the end face of the pole element, a blocking mechanism being associated with the pole element, by means of which blocking element the movement of at least one of its pole rods can be blocked in the second position or a third position with a radial spacing from the first position.

The blocking mechanism firmly holds the blocked pole rod at a spacing from the component, while the unblocked pole rods are either forcibly driven jointly or are placed by spring force or magnetic force against the component, as described above. If the pole rods according to the fourth aspect of the invention are driven jointly, the drive force-limiting device, in other words, for example, the slide coupling of the blocked pole rod, ensures that the unblocked pole rods can be placed against the component.

By means of the blocking device, individual pole rods, within the stack of pole rods, can be blocked in the drawn-back and therefore inactive position. This selectively allows adjustment of a heating profile even with a constant axial length of the region to be heated on the component. In a preferred configuration, it is provided that at least the pole rod situated axially furthest out in the stack or a group of a plurality of adjacent pole rods situated axially furthest out in the stack can be blocked. The axial thermal action region of the induction coil unit can thus be easily controlled.

In a simple configuration, the blocking mechanism, adjacent to the stack of pole rods, has a movable blocking element, which cooperates with stop faces on the pole rods to be blocked, with counter-stop faces for the stop faces of the pole rods to be blocked. The blocking element can be configured as a cam roller, which can be rotatably driven axially parallel to the axis, the cams of which form counter-stop faces cooperating with the stop faces of the pole rods. In order to easily be able to vary and adjust the number of pole rods to be blocked, the stop faces and/or counter-stop faces, in relation to the movement direction of the pole rods and/or of the blocking element, can be arranged staggered, so that they are used with a different adjusting lift.

All the blocking elements preferably have a forced drive connection to a common drive member, for example such that the blocking elements are configured as cam rollers that can be rotated axially parallel to the axis and have pinions that are coupled to a ring gear wheel that is concentric to the axis and can be driven by the drive member. The drive member may in turn be a manual drive member, but also a motorised drive.

In contrast to induction coil units of the type known from DE 199 15 412 A1, the space intended to receive the component to be heated and therefore also the component mentioned therein is easy to access in induction coil units according to the invention, which facilitates handling. Furthermore, the axial overall height is reduced, which improves the use possibilities.

The invention will be described in more detail below with the aid of drawings, in which.

Figure 1:
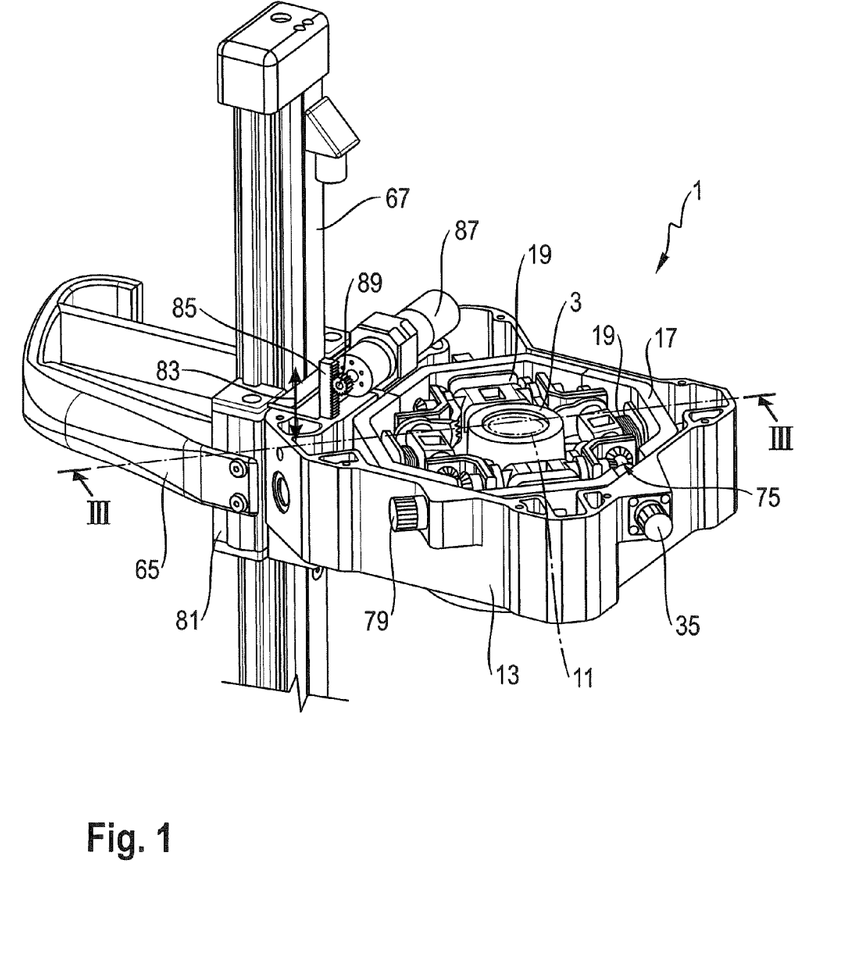
FIG. 1 shows a perspective view of a variant of an induction coil unit to inductively heat a tool holder to clamp and unclamp a tool.
Figure 2:
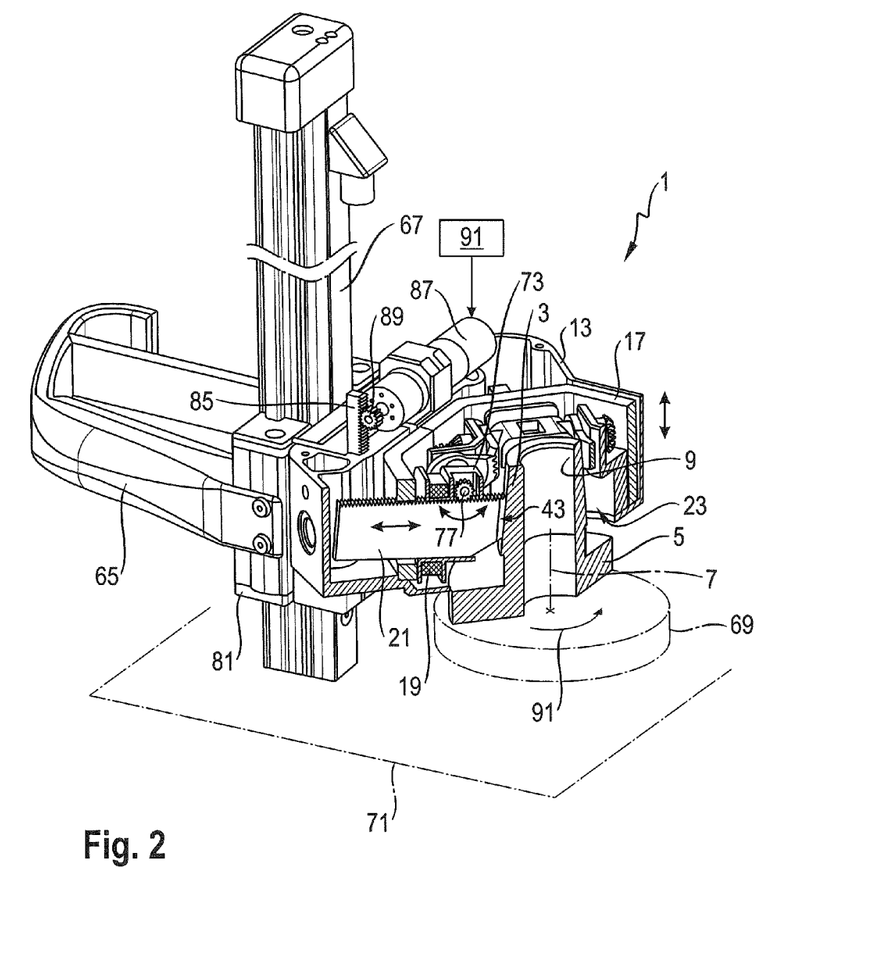
FIG. 2 shows a partially broken open view of the induction coil unit from FIG. 1.
Figure 3:
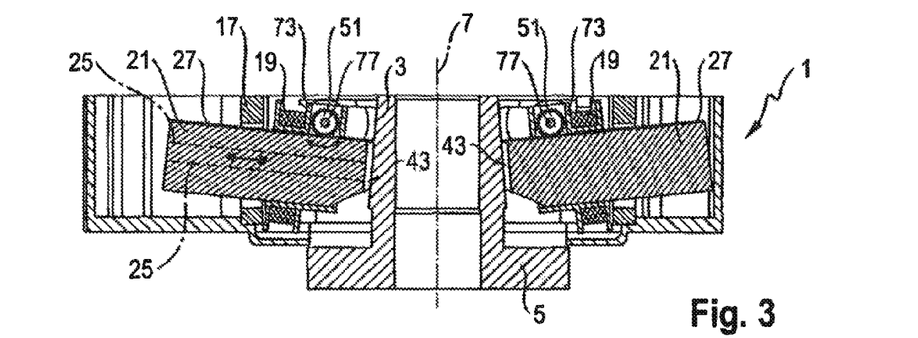
FIG. 3 shows an axial sectional view of the induction coil unit, viewed along a line III to III in FIG. 1.

FIGS. 1 to 3 show an induction coil unit 1, with the aid of which a sleeve part 3, shown broken open in FIG. 2, made of electrically conductive material, steel here, of a tool holder 5 can be heated by an inductive method. The tool holder 5, which is substantially rotationally symmetrical with respect to its rotational operating axis 7, called the "axis" below, has a receiving opening 9, which is central with respect to the axis 7, for receiving, with a press fit, a shaft 11, indicated by a dash-dot diameter line, of a rotary tool, otherwise not shown, rotating about the rotational axis 7 during work operation, for example a drill or milling cutter. The tool shaft, in relation to the internal diameter of the cylindrical receiving opening 9, has an excess dimension and is shrunk into the sleeve part 3. During heating, the sleeve part 3 widens so the tool shaft 11 can be inserted into the receiving opening 9 or removed therefrom. After cooling, the tool shaft 11 inserted in the receiving opening 9 is held in a press fit in the sleeve part 3. The tool holder 5 may be a component of a work spindle of a machine tool or may be provided on the side axially remote from the sleeve part 3 with a conventional spindle coupling such as, for example, a quick-release taper coupling or a hollow shaft coupling (HSC coupling).

The induction coil unit 1 has a substantially annular housing 13 manufactured from electric insulating material, with a rectangular outer contour here, which is axially displaceably held in terms of operation in a manner shown in more detail below on an, in particular, vertical guide of a shrink apparatus.

The housing 13 encloses a yoke ring 17, which is optionally composed of segments, made of a soft magnetic material, for example ferrite, which conducts magnetic flux but is electrically non-conductive, and carries, on the inside of its ring, a plurality of coils 19 arranged at equal angular intervals about the axis 7 and preferably wound from high-frequency litz wire.

The coils 19 are arranged in an even number with equal angular intervals and with coil axes lying in a common axially normal plane about the axis 7. The coils 19, in relation to their diameter, are arranged flat and with a coil axis that is radial with respect to the axis 7. It is obvious that the "transverse field" described above can also be produced with less coils, but also more coils, than would correspond to the number of pole elements. In the individual case, a single coil is sufficient.

Each of the coils 19 surrounds a pole element 21 made of soft-magnetic material, in accordance with the yoke ring 17, which conducts magnetic flux, but is not electrically conductive, for example ferrite, which is displaceably guided on the housing 13 and/or the yoke ring 17 and/or the coils 19 and in the manner which will be described in more detail below. Each pole element 21 passes through the coil 19 here and projects into a receiving space 23 limited by the coils 19 (FIG. 2) to receive the sleeve part 3 of the tool holder 5. The pole elements 21 can be displaced radially up to close to the axis 7 in a manner which will be described in more detail below, so, in a first position, they can also rest on the sleeve parts 3 with a greatly differing diameter. The pole elements 21 can be moved by a drive, which will be described in more detail below, away from the axis 7 into a second radially outer position, in which the sleeve part 3 can be inserted into the receiving space 23 or removed from the receiving space 23.

The induction coil unit 1 of FIGS. 1 to 3 can be displaced by means of a handle 65 along a guide column 67, which is vertical here, relative to the tool holder 5. The tool holder 5 is fixed, with an axis 7 that is parallel to the displacement direction of the guide column 67, on a holder 69. The guide column 67 and the holder 69, as indicated by the common base 71, form an apparatus unit, so the induction coil unit 1 can be placed on the sleeve portion 3 of the tool holder 5 in such a way that the sleeve portion 3 enters a receiving space 23 of the induction coil unit 1.

An even number of coils 19 with a radial coil axis, four coils 19 here, are arranged in the interior of a yoke ring 17 at equal angular intervals about the axis 7. The yoke ring 17 and the coils 19 have plate-like pole elements 21 likewise consisting of magnetically conductive, but electrically non-conductive material, for example ferrite, passing through them, the plate planes of the pole elements 21 lying in radial planes, which enclose the axis 7.

The pole elements 21 are displaceably guided radially with respect to the axis 7 in guide elements 73, which simultaneously also each carry one of the coils 19, specifically in such a way that they can rest with their end face extended in the direction of the axis 7 in a first position along a generatrix of the conical outer casing of the sleeve portion 3 and, in a drawn-back second position, are raised from the outer casing.

Each of the pole elements 21 is provided with a linear tooth system 27, along a narrow edge rim here, which meshes with a drive pinion 51. The pinions, as shown best in FIGS. 1 and 2, are all coupled to one another by means of a gear wheel gearing chain 75, made of bevel gears here, and by a rotary handling grip 35 to one another. All the pole elements 21 can be radially moved simultaneously by means of the rotary handling grip 35.

The synchronous mobility of the pole elements 21 relative to the axis 7 allows the induction coil unit 1 to be adapted to tool holders with a different external diameter. In order to be able to also heat tool holders, the receiving sleeves 3 of which have a different outer cone angle, the guide elements 73 are pivotably mounted on the housing 13 about an axis that is transverse, but in particular perpendicular to the radial planes containing the axis 7. The pivot axes indicated at 77 are coaxial to the rotational axes of the pinions 51 and lie in a common plane normal to the axis 7. In this manner, the angle of inclination of the end face 43 of each pole element can be varied by pivoting the guide element 73 about the axis 77. The guide elements 73 are in turn coupled by a chain made of gear wheel gearings or the like to one another and a rotary adjusting knob 79, which allows the pole elements 21 to be inclined together in such a way that their end face 43 has a linear or surface abutment contact along a generatrix of the conical outer casing of the receiving sleeve 3.

The dimensions of the end face 43 of each pole element 21 are shorter in the direction of the axis 7 than the axial region of the receiving sleeve 3 intended for the press fit engagement. In order nevertheless to be able to inductively heat the entire region of the sleeve portion 3 fixed for the press fit, the induction coil unit 1 is in turn displaceably guided relative to the basic position fixed by the handle 65. The handle 65 is connected to a slide 81 that is displaceable on the guide column 67. The induction coil unit 1 is in turn movably guided in the displacement direction of the slide 81 and therefore parallel to the axis 7, which is indicated in FIG. 1 by a double arrow 83. The slide 81 has a toothed rack 85, which meshes with a pinion 89 driven by an electric motor 87. A controller shown in FIG. 2 at 91 controls the electric motor 87 in such a way that the induction coil unit 1 carries out an oscillating movement along the axis 7, in which the end faces 43 of the pole elements 21 slide along the outer casing of the receiving sleeve 3 and ensure an oscillating displacement of the flooding region of the magnetic flux along the receiving portion 3. In this manner, a press fit region that is comparatively large in the axial direction can even be uniformly heated with pole elements that are relatively narrow in the axial direction.

The controller 91 predetermines the frequency and the amplitude of the axially oscillating movement of the induction coil unit 1. It is obvious that the controller 91 can also predetermine a non-linear movement course, so the instantaneous resistance period of the pole elements 21 relative to the tool holder 5 can be utilised to compensate an irregular heating along the axis 7.

The drive shown for the oscillating movement of the induction coil unit 1 in the direction of the axis 7 with the aid of a pinion toothed rack arrangement is merely by way of example. Other drive mechanisms, for example in the form of an eccentric drive or a hydraulic or pneumatic oscillating drive are conceivable.

The axial oscillating drive allows the axial region of the tool holder that is to be heated to be increased without an over-dimensioning of the induction coil unit. In order to also heat the tool holder 3 in the peripheral direction uniformly, the holder 69, as indicated at 91 by an arrow, can be rotatably driven about the axis 7.

The pole elements 21 only have to be initially placed by means of the handling knob 35 against the outer casing of the receiving sleeve 3. When the coils 19 are switched on, the magnetic field then produced ensures that the end faces 43 of the pole elements 21 remain in abutment contact with the outer casing.

The handling knob 79 provided for the pivoting angle movement can optionally be dispensed with. With adequately smooth gearing couplings, it is sufficient to place the pole elements 21 optionally in a tilted manner against the receiving sleeve 3. The magnetic attraction force present when the coils are excited, in conjunction with the oscillating movement of the induction coil unit 1, ensures that the guide units 73 automatically pivot into a position, in which the end face 43 rests linearly or flat on the receiving sleeve 3.

The end faces 43 can have the cross-sectional configuration described below with the aid of FIG. 11. It may also be provided in a variant that the plate-like pole elements 21 are configured as a stack of pole rods that can be displaced relative to one another radially with respect to the axis, as indicated by dash-dot lines in FIG. 3. The blocking function described below with the aid of FIGS. 8 to 10 can also be realised in the variant of FIGS. 1 to 3.

During the oscillating movement, the pole elements 21 slide with their end faces 34 in the direction of the axis 7 along the generatrix of the outer casing of the sleeve portion 3. Under some circumstances, wear may occur here on the pole elements 21 and/or the sleeve portion 3. In order to reduce the wear, as shown schematically in the embodiment of FIG. 4, the pole element 21 in the region of its end adjacent to the axis 7 may be a wheel 95 rotatably mounted on the pole element 21 about an axis 93, said wheel rolling with its peripheral face 97 during the oscillation movement indicated by a double arrow 99 along the outer casing of the sleeve portion 3. The rotational axis 93 extends transversely to the axis 7 in a plane that is axially normal to the axis 7. The wheel 95 likewise consists of a material conducting magnetic flux, for example ferrite, and forms the actual end face of the pole element 21. As already described above, the pole element 21 is displaceably guided transversely to the axis 7 in accordance with the double arrow 101 and is held in abutment contact with the sleeve portion 3 because of the magnetic forces. An additional pivotable mounting of the pole element 21, as was described with the aid of FIGS. 1 to 3, is unnecessary.

Figure 4:
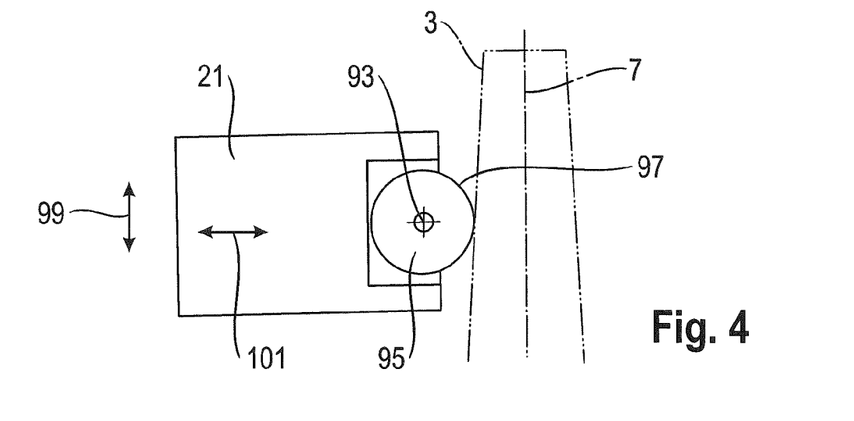
FIGS. 4 to 6 show schematic views of pole elements that can be rolled on the components.
Figure 5:
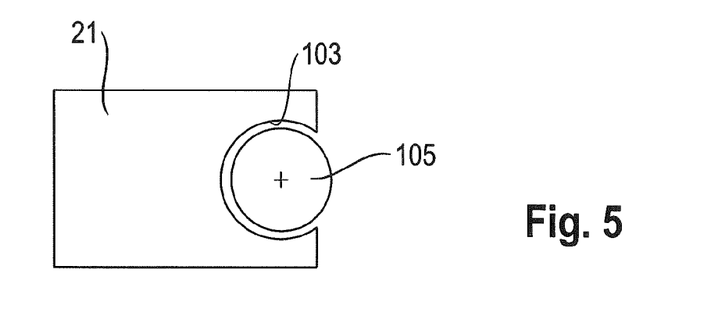

FIG. 5 shows a variant of a pole element 21, which only differs from the pole element 21 of FIG. 4 substantially in that a ball 105 rotatably guided on all sides in a spherical chamber 103 is arranged as an element forming the end face of the pole element. It is obvious that the chamber 103 is also suitable to guide the wheel 95 of FIG. 4.

Configurations, in which a plurality of wheels 95 or balls 105 are arranged offset in the direction of the axis 7 in order to achieve an at least approximately linear contact with the sleeve portion 3, are not shown in more detail. It is obvious that optionally a plurality of wheels or balls can also be arranged next to one another in the direction of the rotational axes thereof.

Figure 6:
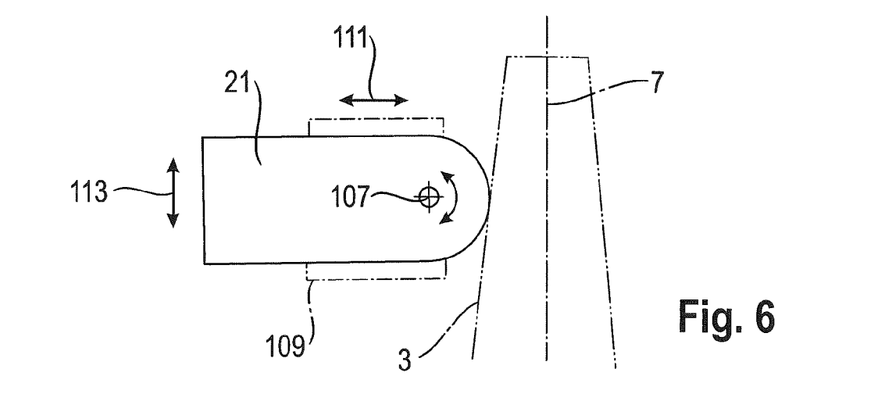

FIG. 6 shows a further variant of a pole element 21, the end face 34 of which is segment of a circle-like. The pole element 21 is pivotably mounted about an axis 107 on a guide 109, centrally with respect to the end face 34. The guide is radially displaceable with respect to the axis 7 in the direction of the double arrow 111, so the end face 34 of the pole element can be brought into abutment contact with the outer casing of the sleeve portion 3 and upon the oscillation movement rolls in the direction of the double arrow 113 on the outer casing of the sleeve portion 3.

In the embodiments of FIGS. 4 to 6, the coils are not shown, but they enclose the pole element, as was described above.

Variants of the induction coil unit will be described below. Components that act the same are designated by the reference numerals of FIGS. 1 to 6. It is obvious that the variants described can be a component both of the versions described above and of the following versions.

Figure 7:
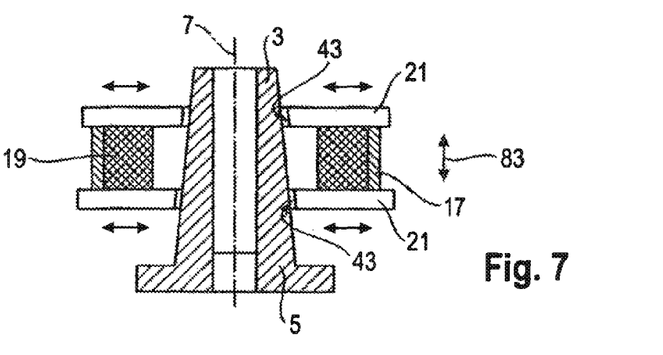
FIG. 7 shows a schematic view of a variant of the induction coil unit of FIG. 1.

In the configurations described above, the pole elements produce a magnetic flux directed in the peripheral direction of the tool holder. As FIG. 7 shows in a schematic view, the idea of realising the heating region of an induction coil unit 1 by an oscillation movement, double arrow 83, in the direction of the axis 7 of a tool holder 5 can also be realised in other coil configurations. In FIG. 7, a coil 19 coaxially surrounding the sleeve portion 3 is terminated at its two axial end faces by pole elements 21. The pole elements 21 are completed on the outside of the coil 19 by a yoke ring 17 to form a magnetic circuit, which limits the magnetic field in the region of the outer casing of the sleeve portion 3 substantially to the region axially between the two pole elements 21. The axial spacing of the pole elements 21 is smaller than the region provided for the press fit of the tool shaft in the receiving sleeve 3 and is enlarged by the oscillation movement of the induction coil unit 1 along the arrow 82 to the desired extent.

The pole elements 21 may be pole discs, as described in DE 199 15 412 A1. The pole elements 21 may, however, also consist of a star arrangement of radially movable pole rods in order to ensure an abutment contact of the end faces 43 adjacent to the axis 7. The pole element 21 situated remote from the free front end of the sleeve portion 3 may optionally be dispensed with.

Figure 8:
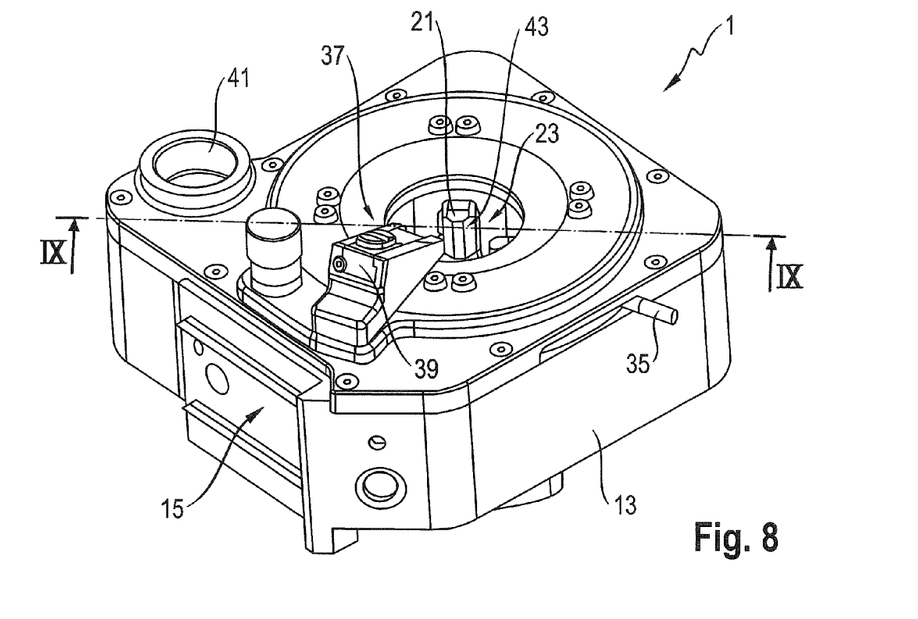
FIG. 8 shows a perspective view of an induction coil unit to inductively heat a tool holder to clamp and unclamp a rotating tool.
Figure 9:
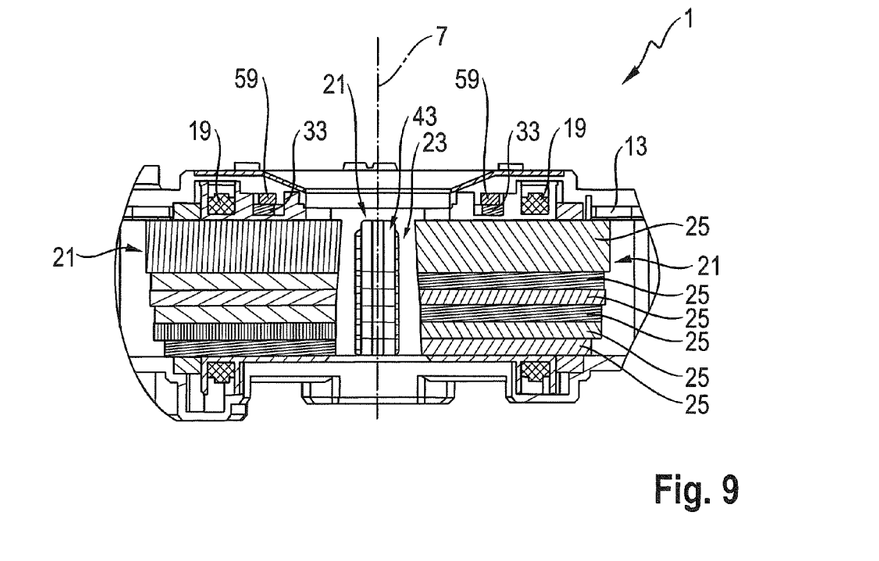
FIG. 9 shows a part of a sectional view through the induction coil unit, viewed along a line IX to IX from FIG. 8.
Figure 10:
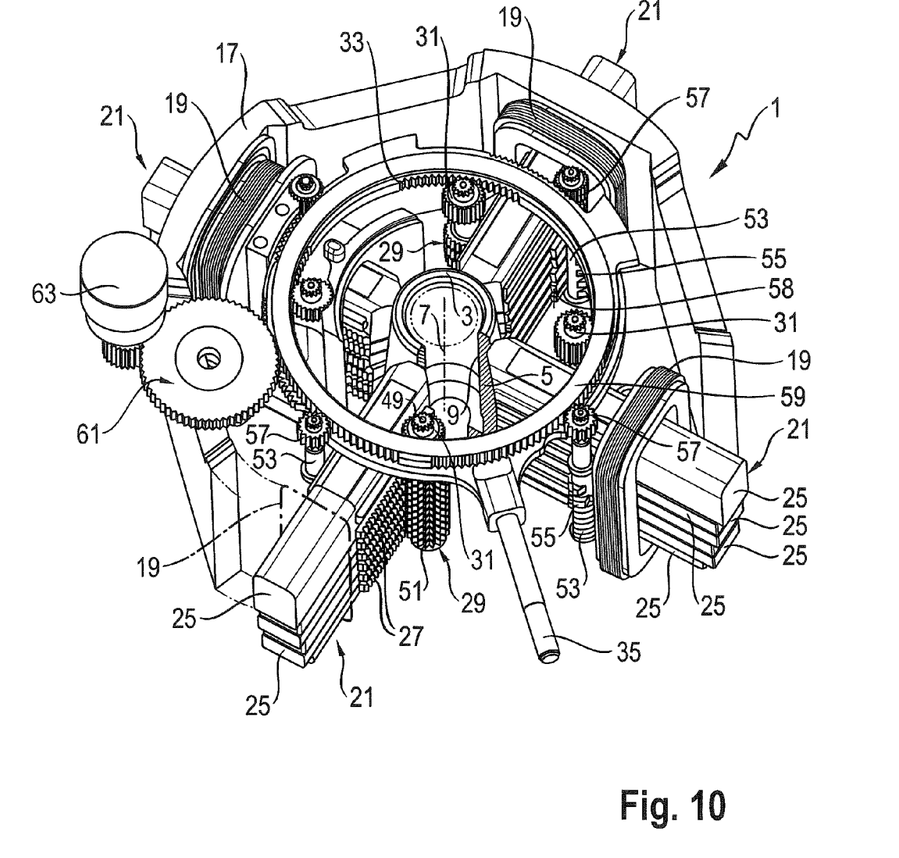
FIG. 10 shows a perspective, partially broken open view of the induction coil unit, in which for a clearer view, its housing and one of its coils are not shown.

FIGS. 8 to 10 show a further variant of an induction coil unit 1 with details of the configuration of the pole elements 21. Measures for the oscillation movement of the induction coil unit 1 relative to the sleeve portion 3 of the tool holder 5 are not shown but may be present. Alternatively, the measures described with the aid of FIGS. 8 to 11 can also be provided in the variants of FIGS. 1 to 3 and 7.

In contrast to the pole elements previously described, the pole elements 21 in the variant of FIGS. 8 to 11 are configured as a stack of pole rods 25 arranged one above the other in the direction of the axis 7, six pole rods 25 in each case here, which can be radially moved jointly but are displaceable relative to one another radially with respect to the axis 7. It is obvious that the pole elements of the previously described induction coil units can also be constructed as a stack of pole rods.

Each of the pole rods 25 comprises a toothed rack-like linear tooth system 27, which mesh with a pinion shaft 29 associated jointly with the pole rods 25 of each rod. The pinion shafts 29 are arranged axially parallel to the axis 7 and each carry a drive gear wheel 31, which in turn meshes with a common first ring gear wheel 33 that can be coaxially rotated with respect to the axis 7 in the housing 13. The ring gear wheel 33 carries a hand lever 35, which is accessible within the housing 13, and by means of which the ring gear wheel 33 can be rotated and therefore the pole elements 21 can be moved jointly radially with respect to the axis 7 by means of the pinion rollers 29.

During operation, the tool holder 5 is fixed to a receiver or holder, not shown in more detail, while the induction coil unit 1 is displaceably guided coaxially with respect to the axis 7 of the tool holder along a generally vertical guide rail, also not shown, in order to be able to introduce the tool holder 5 into the receiving space 23 of the induction coil unit 1. The receiver may be arranged stationarily, but also in turn movably arranged. With a movable receiver, the induction coil unit 1 can also alternatively be arranged stationarily. The same applies to the previously described embodiments. On the tool insertion side of the tool holder 5, the induction coil unit 1 carries a stop 37 (FIG. 8), which, in the operating position, rests on an axial end face of the tool holder 5 and ensures a reproducible position of the induction coil unit 1 relative to the tool holder 5. The stop 37 has a stop finger 39, which is adjustable obliquely with respect to the axis 7 but guided so that it can be stopped, as already explained in DE 10 2005 005 892 A1. Once the induction coil unit 1 has been guided up until the stop 37 rests on the tool holder 5, the pole elements 21 are brought by means of the hand lever 35 into abutment contact on the outer casing of the sleeve portion 3. The following excitation of the coils 19 with alternating current induces in the sleeve portion 3 a magnetic flux, which runs in the peripheral direction and heats the sleeve portion 3 to clamp or unclamp the tool shaft. By means of a coolant connection that can be seen at 41 in FIG. 1, cooling air or cooling liquid is guided via one or more nozzles against the heated tool holder 5, which is cooled thereby to a temperature that is not dangerous to touch.

The tool holder 5, as shown in FIG. 10, has a conical outer casing, while the inner casing forming the receiving opening 9 is cylindrical. Both the thickness of the material cross-section and the outer peripheral length of the receiving sleeve 3 therefore increase in the direction of the axis 7 from the tool insertion side located at the top in FIG. 10. The changing dimensions influence the eddy current excitation in the receiving sleeve 3 and therefore the local heating which would change in the axial direction without counter-measures.

In order to ensure uniform heating of the receiving sleeve 3 in the direction of the axis 7, the pole elements 21 have end face regions 43, the cross-sectional contour of which changes based on planes normal to the axis 7, in the direction of the axis 7, at least between two adjacent pole pieces 25.

Figures 11A, 11B:
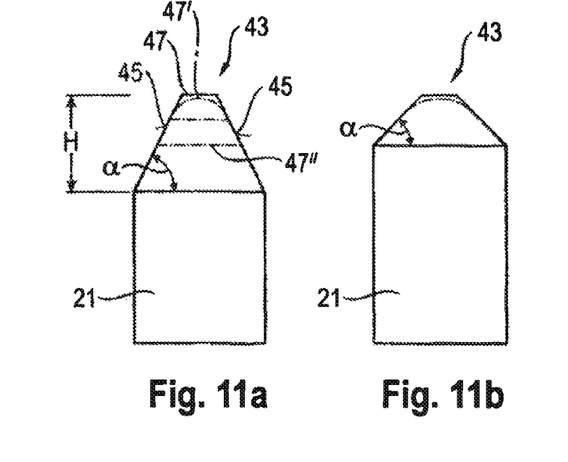
FIG. 11 shows a schematic view of a plurality of pole rods of a stack of pole rods of the induction coil unit of FIG. 8.
Figure 11C:
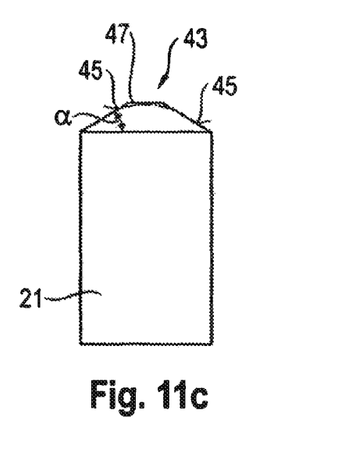

FIG. 11 schematically shows plan views of pole rods 21, viewed in the direction of the axis 7. FIG. 11*a* shows the plan view here of the pole pin resting in the region of the tool insertion side on the region with the smallest diameter of the outer casing of the receiving sleeve 3, while FIG. 11*c* shows the contour of the pole pin 21 resting in the region with the largest diameter of the outer casing. FIG. 11*b* shows one of the pole pins 21 arranged between the uppermost and the lowermost pole pin in the stack.

The contour of each end face region 43 is fixed by two part face regions 45 inclined toward one another (FIG. 11*a*) which merge with one another in an apex region 47 intended to rest on the outer casing of the receiving sleeve 3 of the tool holder 5 and extending in the direction of the axis 7. In the embodiment shown, the lateral part faces 45 and the face of the apex region 47 are level and limit a trapezoidal cross-section, the apex face angle α of which decreases in the direction of the axis 7 from the region with the smallest diameter of the outer casing to the region with the largest diameter. The width of the level apex face, viewed in the peripheral direction of the tool holder 5, is approximately constant from pole rod to pole rod, but the radial height H decreases accordingly.

As indicated by dash-dot lines in FIGS. 11*a* to 11*c*, the level apex face 47 can also be replaced by a curved apex face 47'. The curvature can optionally also extend at least over a part region of the part faces 45. The radius of curvature increases here in the direction of the widening conical outer casing of the sleeve portion. In this configuration, the pole rods 21 can form rounded end face regions 43, at least in the apex region. Also alternatively, the inclination angle α can be the same from pole rod to pole rod, the height H then decreasing in the direction of the widening cone face of the outer casing, as additionally indicated for the lowermost pole rod relative to the contour of the uppermost pole rod, for example, in FIG. 11*a* at 47".

By varying the end face cross-section of the pole rods, the transition of the magnetic flux from the pole rod to the tool holder is varied, as are therefore the magnetic flux intensity and, accordingly, the eddy current amplitude in the contact region of the pole rod. It is obvious that end region cross-sections varying in the direction of the axis 7 can also be applied in one-piece pole elements, in other words pole elements which are not constructed in a segmented manner from stacked pole rods.

The induction coil unit 1 should also be able to be used as diversely as possible in tool holders with a different cone angle of the outer casing thereof. In order to ensure that the end face region 43 of each pole rod 25 taken individually, even with a variation of the cone angle, has abutment contact with the outer casing, the pinion roller 29 on a common shaft rigidly connected to the drive wheel 31, carries a plurality of individual pinions 51 rotatably mounted on the shaft 49, which each mesh with a linear tooth system 27 of one of the pole rods 25. The pinions 51 rotatably seated on the shaft 49 are coupled either to the shaft 49 or an adjacent pinion 51 by means of a slide coupling (not shown), in each case. The pinion shaft 29 can therefore not only drive all the pole rods 25 jointly, but also allows relative displacements between pole rods 25, the pinions 51 of which are driven by a slide coupling.

It is obvious that all the pinions 51 can be coupled by slide couplings to the shaft 49 but, in the individual case, at least a part of the pole rod 25 resting in the region with the smallest diameter of the outer casing of the sleeve portion 3, the uppermost pole rod here, the associated pinion can also be positively coupled to the shaft 49, while other pinions 51 associated with the region with the largest diameter of the outer casing can be non-positively connected to a limited extent, for example by slide couplings, to the shaft 49. The slide couplings can be effective between the pinion and the shaft 49, so these pinions are driven parallel to one another. A serial arrangement is also conceivable in slide couplings, if their triggering torque from pinion to pinion reduces in the direction of the widening conical outer casing of the receiving sleeve 3.

The region of the receiving sleeve 3 of the tool holder 5, which is flooded by the magnetic flux, should expediently be limited to the axial region, in which the tool shaft is held in a press fit in order, on the one hand, to only thermally load the tool holder 5 a little and, on the other hand, to reduce the cooling outlay and the timespan required for cooling. In conventional induction coil units, the region flooded by the magnetic flux is fixed by the axial dimensions of the pole elements bringing about the magnetic flux. In order to be able to change the number of pole rods 25 resting on the receiving sleeve 3 during operation, and therefore the effective axial height of the pole elements 21, cam rollers 53 are rotatably arranged to the side of the pole elements 21 in the peripheral direction, the cams 55 of which cam rollers cooperate with stop faces 57 formed on the individual pole rods 25. The cams 55, when the pole rods 25 are drawn back radially by the tool holder 5, can be pivoted into the displacement path thereof and thus block the feed movement of the pole rod 25 toward the tool holder 5. The blocked pole rods 25 are then blocked with respect to the flooding.

Each of the camshafts 53 carries a drive gear wheel 57, which meshes with a second ring gear wheel 59 in turn rotatably mounted coaxially with respect to the axis 7 in the housing 13. The ring gear wheel 59 can be driven by means of an intermediate gearing 61 by a rotary hand knob 63, so mutually corresponding pole rods 25 of the individual pole elements 21 can be blocked or released together. It is obvious that the hand actuation knob 63, like the hand lever 35, can optionally be replaced by electric motor drives.

The cams 55 and/or stop faces 57 are expediently arranged staggered, so they engage successively depending on the rotation of the cam shafts 53 and, accordingly, a variable number of pole rods 25 can be blocked. Expediently, the staggering of the cams 55 and the stop faces 57 is selected such that, starting with the lowermost pole rod resting on the region with the largest diameter of the outer casing of the receiving sleeve 3, the pole rods can be blocked in sequence. However, it is obvious that pole rods optionally also arranged between the end pole rods 25 can be blocked in a targeted manner to control the heat distribution in a centre region of the stack.

The invention claimed is:

1. Induction coil unit for heating a component, the induction coil unit comprising:
    a receiving space that is central with respect to an axis for the component;
    at least one pole element made of a material with soft magnetic properties conducting magnetic flux;
    at least one coil configured to be fed with alternating current to produce magnetic flux in the at least one pole element; and
    wherein the at least one pole element has an end face, which substantially radially faces the axis and has abutment contact, or virtually abutment contact, with an outer peripheral face of the component, and wherein a drive arrangement is provided, which drives at least the at least one pole element and a holder for the component, at least during a part of the timespan, in which the at least one coil is fed with alternating current, to move relative to one another in the direction of the axis in a longitudinally movable manner and/or to rotate about the axis,
    wherein the at least one pole element includes a wheel or roller or ball configured to slide with an end face in the direction of the axis, the wheel or roller or ball configured to roll during relative oscillation movement of at least one pole element and the component in the direction of the axis and/or about the axis and prevent wear between the at least one pole element and the component.

2. Induction coil unit according to claim 1, wherein a plurality of pole elements distributed about the axis, are provided, which are movably guided on the unit radially with respect to the axis and are movable between a position close to the axis and a position remote from the axis and with their end faces substantially radially facing the axis in the position that is close to the axis, at least in a part region of their axial height, have abutment contact, or virtually abutment contact, with the outer peripheral face of the component.

3. Induction coil unit according to claim 2, wherein at least one coil configured to be fed with alternating current to produce magnetic fluxes in the pole elements is provided and the end faces of the pole elements in a first position, at least in the part region of their axial height along a generatrix of the outer peripheral face of the component, have abutment contact with the outer peripheral face of the component.

4. Induction coil unit according to claim 3, wherein a plurality of the coils are to be fed with the alternating current.

5. Induction coil unit according to claim 2, wherein the plurality of pole elements are distributed at equal angular intervals.

6. Induction coil unit according to claim 1, wherein the axial height of the at least one pole element is smaller than the axial region of the component to be heated.

7. Induction coil unit according to claim 1, wherein a coil surrounding the component is provided and at least one pole element is arranged on at least one axially situated side of the coil.

8. Induction coil unit according to claim 7 wherein the pole elements are arranged on the two axial sides of the coil.

9. Induction coil unit according to claim 1, wherein the at least one coil and the at least one pole element form a unit that is movable relative to the holder and the drive arrangement drives this unit and the holder in the direction of the axis relative to one another in an oscillating movement in the direction of the axis.

10. Induction coil unit according to claim 1, wherein a controller, which controls an instantaneous speed of relative movement and/or current strength of the alternating current feeding the at least one coil, depending on an instantaneous position of the at least one pole element relative to the holder, controls an electric motor of the drive arrangement.

11. Induction coil unit according to claim 1, wherein at least one pole element adjacent to the axis the wheel or roller or ball, is rotatable or pivotable about a rotational axis running transversely to the axis and made of a material with soft magnetic properties conducting magnetic flux, which pole element forms an end face, which is curved about the rotational axis, and which is rollable with abutment contact on the outer peripheral face of the component.

12. Induction coil unit according to claim 11, wherein the pole element is circularly curved coaxially with respect to the rotational axis.

13. Induction coil unit according to claim 1, wherein the component is a sleeve part, which holds an elongate item in a press fit in the receiving space forming a receiving opening that is central with respect to the axis.

14. Induction coil unit according to claim 13, wherein the electrically conductive material is adapted to heat the sleeve part of a tool holder, which holds a shaft of a rotary tool in a press fit in its receiving opening that is central with respect to the axis.

15. Induction coil unit according to claim 14, wherein the rotary tool is a drilling or milling tool.

16. Induction coil unit for heating a component, which is rotationally symmetrical relative to an axis and made of electrically conductive material, the induction coil comprising:
    a receiving space that is central with respect to the axis for the component;
    a plurality of pole elements, which are arranged distributed about the axis at equal angular intervals, made of a material with soft magnetic properties conducting magnetic flux;
    at least one coil configured to be fed with alternating current to produce magnetic fluxes in the pole elements;
    wherein the pole elements are movably guided on the unit radially with respect to the axis and are movable between a first position close to the axis and a second position remote from the axis; and
    wherein the pole elements have end faces, substantially radially facing the axis, which, in the first position, have an abutment contact, or virtually abutment contact, with the outer peripheral face of the component, and wherein the pole elements are each movably guided in a guide element, in each case, between the first and the second position and in that the guide elements are in each case pivotably movably mounted about a pivot axis running transversely to the axis and running, wherein the guide elements, for a pivoting movement in the same direction, are coupled to one another by a gearing and, wherein the pole elements include a wheel or roller or ball configured to slide with an end face in the direction of the axis, the wheel or roller or ball configured to roll during relative oscillation movement of the at least one pole element and the component in the direction of the axis and/or about the axis and prevent wear between the pole elements and the component.

17. Induction coil unit according to claim 16, wherein the pole elements are configured as a stack of a plurality of pole rods movably guided relative to one another parallel to one another radially with respect to the axis, of which the ends facing the axis form the end face of the pole element, the stack of pole rods of each pole element being displaceably guided, in each case, on a respective the guide elements.

18. Induction coil unit according to claim 16, wherein each pole element has a linear tooth system, which meshes with a drive pinion mounted on the guide element, and the drive pinion has a drive connection to a common drive member.

19. Induction coil unit according to claim 16, wherein the end face of the pole element is substantially circularly curved about the pivot axis coaxially with respect to the pivot axis.

20. Induction coil unit according to claim 16, wherein the component is a sleeve part, which holds an elongate item in a press fit in the receiving space forming a receiving openings that is central with respect to the axis.

21. Induction coil unit according to claim 20, wherein electrically conductive material is adapted to heat the sleeve part of the tool holder, which holds a shaft of a rotary tool in a press fit in its receiving opening that is central with respect to the axis.

22. Induction coil unit according to claim 21, wherein the rotary tool is a drilling or milling tool.

23. Induction coil unit according to claim 16, wherein the elements are also coupled to a common drive member.

24. Induction coil unit according to claim 16, wherein the end faces of the pole elements have the abutment contact or virtually abutment contact with the outer peripheral surface of the component at least in a part region of their axial height along a generatrix of an outer peripheral face of the component.

25. Induction coil unit according to claim 16, wherein the pivot axis runs in a common plane normal to the axis.

* * * * *